May 10, 1966
H. W. THYLEFORS  3,250,462
METHOD AND APPARATUS FOR SLUDGE CONCENTRATION BY CENTRIFUGATION
Filed Nov. 29, 1962
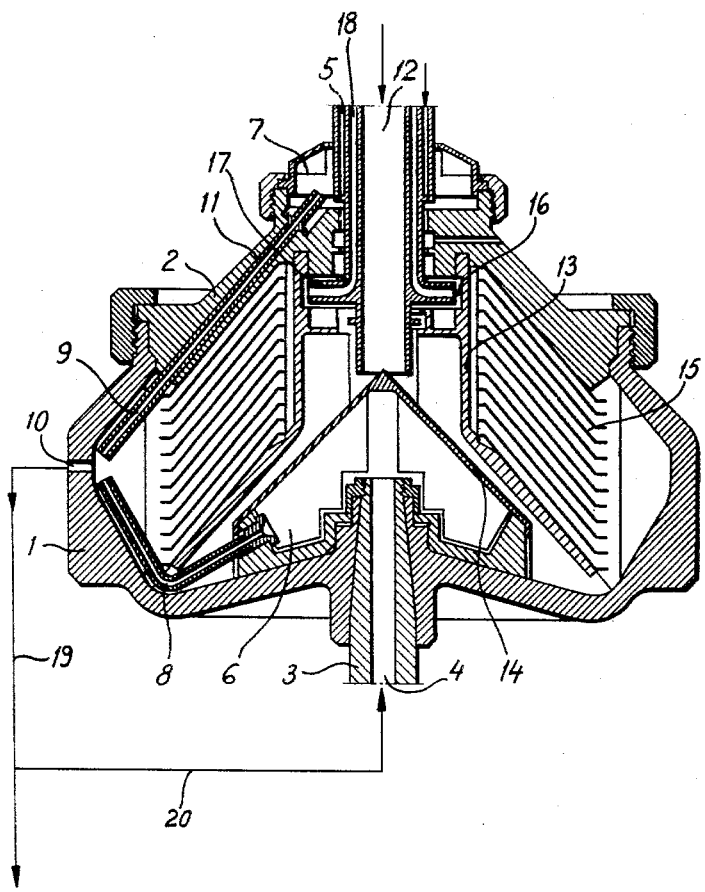
INVENTOR.
Henric Wilhelm Thylefors
BY
Davis, Hoxie, Faithfull & Hapgood
Attorneys for Applicant

United States Patent Office 3,250,462
Patented May 10, 1966

3,250,462
METHOD AND APPARATUS FOR SLUDGE CONCENTRATION BY CENTRIFUGATION
Henric Wilhelm Thylefors, Stockholm, Sweden, assignor to Aktiebolaget Separator, Stockholm, Sweden, a corporation of Sweden
Filed Nov. 29, 1962, Ser. No. 240,813
Claims priority, application Sweden, Nov. 29, 1961, 11,898/61
2 Claims. (Cl. 233—14)

This invention relates to centrifugation and more particularly to an improved method and apparatus for centrifugally concentrating and washing the solid or sludge phase in a liquid suspension of solids.

The concentration and washing of the solid phase in a suspension by centrifugation, as when producing starch, has been carried out in such a way that the liquid to be separated, such as a suspension of starch slush, fibers and starch in diluted fruit water, is fed to a so-called nozzle centrifuge which separately discharges a starch concentrate as a heavy phase and a lightweight phase containing the major part of starch slush and fibers. A part of the discharged starch concentrate is fed, as liquid to be separated, to another nozzle centrifuge while the other part of the starch concentrate is returned to the first-mentioned centrifuge in which it is conveyed close to the inner openings of the nozzles, in order to control the sludge concentration and to prevent the nozzles from becoming clogged. A washing liquid (water) is fed to the second centrifuge together with the above-mentioned concentrate, constituting a liquid to be separated, which washing liquid is conveyed close to the entrance openings of the discharge nozzles in order to wash the starch phase concentrated there. The second centrifuge separately discharges a starch concentrate, washed as mentioned, and a lightweight phase consisting of the spent washing liquid with the impurities dissolved or suspended in it.

The principal disadvantage of this prior method and apparatus is that the sludge concentration and the washing must be carried out in two stages in different centrifuges, thus entailing high costs of installation, maintenance and labor, high consumption of energy and, in certain cases, comparatively large losses with respect to the finished product.

The principal object of the present invention is to eliminate the above-mentioned drawbacks by means of a method and apparatus for sludge concentration by centrifugation, wherein the obtained sludge concentrate is washed and partly recirculated. The method is mainly characterized by the washing and the recirculation being carried out at the same time and in the same centrifuge as the sludge concentration.

The apparatus of the present invention comprises a centrifuge rotor having a rotor body and a rotor hood and secured to a rotary shaft, the rotor being provided with an axial inlet for a washing liquid and another axial inlet for a recirculated liquid. The rotor also has nozzles in the mantle of the rotor body, which nozzles are located in the area corresponding to the rotor body's largest inner diameter. Means are provided for conveying a washing liquid and a recirculated liquid, respectively, inside the centrifuge from the respective axial inlets to the zone where the nozzles are located.

The means inside the centrifuge rotor for conveying the washing liquid and the recirculated liquid from the respective axial inlets to the nozzles may be of conventional form, such as conical disks placed adjoining and parallel to the inner walls of the centrifuge rotor and provided with impressed grooves or recesses, or smooth disks cooperating with grooves or recesses arranged in the inner walls of the centrifuge rotor, or radially arranged pipes adjacent the inner walls of the rotor and secured to these walls in a suitable way, the pipes being straight or bent. The latter embodiment of the conveying means, that is, straight or bent pipes, is preferable, especially when the inner diameter of the opening of the rotor body is considerably smaller than the rotor body's largest inner diameter. One of the conveying means for the washing liquid and the recirculated liquid may be arranged inside the rotor hood, preferably as straight pipes inserted in holes in the hood.

For a better understanding of the invention, reference may be had to the accompanying drawing which is a vertical sectional view of a preferred embodiment of the new apparatus.

In the drawing, reference numeral 1 designates a hollow rotor body which, with a rotor hood 2, forms the main part of a centrifuge rotor secured to a rotary shaft 3 extending through the center of the rotor bottom. The rotary shaft 3 is provided with a central bore 4 through which one of a washing liquid and a recirculated liquid is fed axially to the centrifuge rotor. The other of these liquids is supplied to the centrifuge rotor from the opposite direction through a substantially axial inlet 5, the latter being of annular form concentric to the rotor axis. The liquid which is fed through the bore 4 is admitted to a closed chamber 6 from which it is conveyed by the action of centrifugal force through a pipe 8 to the entrance orifice of nozzles 10 through which the sludge concentrate obtained by centrifugation is discharged. The liquid which is fed through the inlet 5 is admitted to a chamber 7, which may be open to atmosphere and from which this liquid is discharged via a pipe 9 to the entrance orifices of the nozzles 10, due to the action of the centrifugal force. Reference numeral 11 designates a bore arranged in the wall of the rotor hood 2 to receive the pipe 9, which is inserted and fastened in a suitable way.

The main feed material, a liquid suspension of solids, is fed axially to the locus of centrifugal force in the rotor through a stationary central feed tube 12. From the lower end of this tube, the feed material flows outwardly between a central distributor 13 and a cover 14 of chamber 6, and thence around the outer edge of distributor 13 and into the separating chamber containing a set of conical spaced disks 15. The centrifugally separated sludge is discharged through the peripheral nozzle 10 and similar nozzles (not shown) spaced around the rotor periphery. The liquid from which the sludge is thus separated is displaced inwardly between the disks 15 and, by way of a passage (not shown), enters a paring chamber 16 containing the usual paring device 17 carried by the stationary feed tube 12. The pared liquid discharges from the paring device through an annular channel 18 surrounding feed tube 12.

As shown, the axial bore 4 of the rotor shaft 3 is used for returning part of the discharged sludge from peripheral nozzles 10 to the entrances of these nozzles by way of chamber 6 and the conveyor means 8, it being understood that there is a separate pipe 8 for each nozzle 10. More particularly, the discharged sludge from nozzles 10 is collected in the usual manner and led away through pipe line 19, from which a branch 20 returns part of the sludge to the rotor through bore 4. The other auxiliary inlet 5, which surrounds outlet 18, is used for supplying the washing liquid to the entrance of each nozzle 10 by way of chamber 7 and pipe 9, it being understood that there is a separate pipe 9 for each nozzle. Of course, as previously indicated, the auxiliary inlets 4 and 5 may be used for supplying the washing liquid and the recycled sludge, respectively, instead of the reverse as illustrated.

I claim:
1. In the centrifugal concentration of sludge contained in a liquid suspension, the method which comprises feed- ing the suspension to a rotating locus of centrifugal force and there centrifugally separating sludge from the suspension liquid, said sludge moving outwardly in the locus under the action of centrifugal force and toward an outlet at the periphery of the locus, feeding separately confined streams of washing liquid and previously separated sludge outwardly through said locus under said force and releasing said streams in the region immediately adjacent the entrance to said peripheral outlet, whereby newly separated sludge is washed by the washing liquid and said last liquid is displaced inward toward the rotation axis by said newly and previously separated sludge, discharging the washed newly separated sludge and previously separated sludge through said outlet, separately discharging the separated suspension liquid and washing liquid from the locus inwardly from said periphery, and separately returning part of the discharged sludge to the locus axially thereof to supply said confined stream of previously separated sludge.

2. Apparatus for centrifugally concentrating sludge contained in a liquid suspension, which comprises a hollow centrifugal rotor forming a single separating chamber and having an inlet for said suspension, the rotor having at its outer periphery a nozzle outlet for discharging separated sludge from said chamber and also having an outlet located radially inward from said periphery for discharging separated liquid, the rotor also having two auxiliary inlets located at opposite ends of the rotor at the region of the rotor axis, means for separately feeding a washing liquid and a concentrated sludge to said auxiliary inlets, respectively, and separate conveying means in the rotor for simultaneously conveying separate streams of said washing liquid and concentrated sludge, respectively, from the respective auxiliary inlets to the region immediately adjacent the entrance to said nozzle outlet.

References Cited by the Examiner
UNITED STATES PATENTS

| | | | |
|---|---|---|---|
| 1,923,454 | 8/1933 | Peltzer et al. | 233—14 |
| 1,933,119 | 10/1933 | Peltzer et al. | 233—28 |
| 2,060,239 | 11/1936 | Peltzer | 233—47 |
| 2,599,619 | 6/1952 | Eckers | 233—47 X |
| 2,628,021 | 2/1953 | Staaff | 233—14 |
| 2,685,369 | 8/1954 | Crossley | 233—14 X |
| 2,910,226 | 10/1959 | Thylefors | 233—14 |
| 2,917,230 | 12/1959 | Kaldewey | 233—14 |
| 2,958,461 | 11/1960 | Peltzer | 233—14 |
| 2,973,896 | 3/1961 | Peltzer | 233—19 |
| 3,011,647 | 12/1961 | Elsken | 233—14 X |
| 3,080,108 | 3/1963 | Jacobson | 233—28 X |

M. CARY NELSON, *Primary Examiner.*

ROBERT F. BURNETT, *Examiner.*